US007499199B2

(12) United States Patent
Kurumisawa et al.

(10) Patent No.: US 7,499,199 B2
(45) Date of Patent: Mar. 3, 2009

(54) IMAGE PROCESSING CIRCUIT, IMAGE DISPLAY APPARATUS, AND IMAGE PROCESSING METHOD

(75) Inventors: Takashi Kurumisawa, Shiojiri (JP); Kenji Mori, Matsumoto (JP); Hiroshi Horiuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 813 days.

(21) Appl. No.: 10/971,074

(22) Filed: Oct. 25, 2004

(65) Prior Publication Data

US 2005/0111046 A1 May 26, 2005

(30) Foreign Application Priority Data

Oct. 30, 2003 (JP) ............................ 2003-370631

(51) Int. Cl.
*H04N 1/40* (2006.01)

(52) U.S. Cl. ..................................... 358/3.23; 382/237

(58) Field of Classification Search .................. 358/1.9, 358/2.1, 3.23, 3.21, 3.1, 3.02, 3.06; 382/237
See application file for complete search history.

(56) References Cited

U.S. PATENT DOCUMENTS

| | | | | |
|---|---|---|---|---|
| 5,920,407 A * | 7/1999 | Erickson et al. | ............. | 358/504 |
| 6,480,306 B1 * | 11/2002 | Chien | ......................... | 358/509 |
| 2005/0002563 A1 * | 1/2005 | Hoshuyama | ................ | 382/162 |
| 2005/0094170 A1 * | 5/2005 | Ichitani | ...................... | 358/1.9 |

FOREIGN PATENT DOCUMENTS

| | | |
|---|---|---|
| JP | A 09-271036 | 10/1997 |
| JP | A 2002-016805 | 1/2002 |
| JP | A 2002-534007 | 10/2002 |
| JP | A-2003-203225 | 7/2003 |
| JP | A-2003-274160 | 9/2003 |
| WO | WO 00/38412 | 6/2000 |

* cited by examiner

*Primary Examiner*—Thomas D Lee
*Assistant Examiner*—Stephen M Brinich
(74) *Attorney, Agent, or Firm*—Oliff & Berridge, PLC

(57) ABSTRACT

Aspects of the invention can provide an image processing circuit for gray scale correction, an image display apparatus, and an image processing method that allow reduction in the storage capacity needed for storing correction characteristics data without increasing clock rate in relation to interpolation processing of correction characteristics. A exemplary image processing circuit according to the invention can be applied, for example, to color correction or gamma correction of color image data. Gray scale correction characteristics data for a number of gray scale levels that is less than the number of gray scale levels of input image data can be stored in first and second lookup table storing units. Considering a gray scale value of a pixel that is being considered for gray scale correction processing as an input gray scale value, the first and second lookup-table storing units are referred to, obtaining an output gray scale value corresponding to the input gray scale value and an output gray scale value corresponding to an adjacent input gray scale value. An adjacent gray scale value refers to a gray scale value that is higher by one or lower by one than another input gray scale value. Then, output gray scale values between these two adjacent output gray scale values can be calculated by linear interpolation, obtaining output values for all input gray scale values. Subsequently, gray scale correction can be performed for each pixel of input image data, outputting corrected image data.

11 Claims, 9 Drawing Sheets

$$\begin{bmatrix} Rout \\ Gout \\ Bout \end{bmatrix} = \begin{bmatrix} a1 & a2 & a3 \\ b1 & b2 & b3 \\ c1 & c2 & c3 \end{bmatrix} \begin{bmatrix} Rin \\ Gin \\ Bin \end{bmatrix}$$

X ADDRESS (Xads)

| Y ADDRESS (Yads) | 0 | 1 | 2 | 3 |
|---|---|---|---|---|
| 0 | 0 | 12 | 2 | 14 |
| 1 | 8 | 4 | 10 | 6 |
| 2 | 3 | 15 | 1 | 13 |
| 3 | 11 | 7 | 9 | 5 |

IMAGE PROCESSING CIRCUIT, IMAGE DISPLAY APPARATUS, AND IMAGE PROCESSING METHOD

BACKGROUND OF THE INVENTION

1. Field of Invention

Aspects of the invention can relate to gray scale correction processing of image data. More specifically, the invention can relate to gray scale correction processing, such as color correction or gamma (γ) correction based on lookup tables (LUTs).

2. Description of Related Art

Related art gamma correction processing is processing for adjusting display characteristics of image data in accordance with characteristics of a display device, such as a CRT or an LCD in an image display apparatus for displaying image data. Generally, gamma correction processing can be carried out using, for example, an LUT storing gamma characteristics data (gray scale correction characteristics data) created on the basis of the display characteristics of a display device. Gamma characteristics define relationship between input gray scale values and output gray scale values. The image display apparatus obtains output gray scale values corresponding to input gray scale values of input image data by referring to the gamma characteristics, and displays an image corresponding to the image data on a display device according to the output gray scale values.

Also, when the image display apparatus performs color correction on input image data to achieve desired color characteristics for display, an LUT storing color conversion characteristics prepared in advance is used. An example of such related art color correction and gamma correction is disclosed in Japanese Unexamined Patent Application Publication No. 9-271036.

With the recent improvement in picture quality in cellular phones and other electronic apparatuses, the capacity of a storage device, such as a RAM needed to implement an LUT for gray scale correction characteristics data increases as the number of gray scale levels of image data increases. In view of this, a method has been proposed in which gray scale correction characteristics data for a number of gray scale levels smaller than the number of gray scale levels of input image data is stored in an LUT and gray scale correction characteristics data for the insufficiency is interpolated by linear approximation or the like. (Refer to, for example, PCT Japanese Translation Patent Publication No. 2002-534007).

In order to interpolate gray scale correction characteristics data by linear approximation or the like, output gray scale values of two endpoints of a portion to be interpolated are needed, so that reading operation must be executed twice with an LUT storing a single set of gray scale correction characteristics data. Thus, power consumption increases due to the increased number of times of reading operation, and a clock rate higher than a normal clock rate is required.

SUMMARY OF THE INVENTION

An aspect of the invention can provide an image processing circuit for gray scale correction, an image display apparatus, and an image processing method that allow reduction in the storage capacity needed for storing correction characteristics data without increasing clock rate in relation to interpolation processing of correction characteristics.

According to an aspect of the invention, an exemplary image processing circuit can include an input unit that receives input of image data represented in n gray scale levels, first and second lookup-table storage units that store gray scale correction characteristics data for m gray scale levels, m being less than n, an interpolation circuit that linearly interpolates the gray scale correction characteristics data using outputs from the first and second lookup-table storage units, the outputs being associated with mutually adjacent input gray scale values, and a gray scale correcting circuit that corrects gray scales of the image data using gray scale correction characteristics data obtained by the linear interpolation.

The image processing circuit according can be applied, for example, to color correction or gamma correction of color image data. Gray scale correction characteristics data for a number of gray scale levels that is than the number of gray scale levels of input image data is stored in first and second lookup table storing units. Considering a gray scale value of a pixel that is being considered for gray scale correction processing as an input gray scale value, the first and second lookup-table storing units are referred to, obtaining an output gray scale value corresponding to the input gray scale value and an output gray scale value corresponding to an adjacent input gray scale value. An adjacent gray scale value refers to a gray scale value that is higher by one or lower by one than another input gray scale value. Then, output gray scale values between these two adjacent output gray scale values are calculated by linear interpolation, obtaining output values for all input gray scale values. Then, gray scale correction is performed for each pixel of input image data, outputting corrected image data.

Since a lookup table that stores gray scale correction characteristics data for a smaller number of gray scale levels than the gray scale levels of input image data is used, compared with a case where gray scale correction characteristics data for all the gray scale levels is stored, the capacity of a storage device, such as a RAM, needed to implement the lookup table is reduced. Although mutually adjacent two output gray scale values are needed for linear interpolation of gray scale correction characteristics data, since linear interpolation is carried out using output gray scale values read from two lookup tables, it is not required to read twice from a single lookup table by a high-speed (e.g., twice as fast) clock. Thus, clock rate is not increased, and increase in power consumption is avoided.

According to a mode of the image processing circuit, the first and second lookup-table storage units store the same gray scale correction characteristics data. Accordingly, it is possible to obtain mutually adjacent two output gray scale values from the respective lookup-table storage units and to interpolate output values therebetween by linear interpolation.

In a preferred embodiment of the mode, the interpolation circuit uses a first output gray scale value output from the first lookup-table storage unit and a second output gray scale value output from the second lookup-table storage unit, the second output gray scale value being less than the first output gray scale value, to interpolate gray scale correction characteristics data between the first output gray scale value and the second output gray scale value.

According to another exemplary mode of the image processing circuit, the first lookup-table storage unit stores gray scale correction characteristics data for the m gray scale levels, and the second lookup-table storage unit stores difference values between adjacent gray scale values in the gray scale correction characteristics data for the m levels. Accordingly, using an output gray scale value corresponding to an input gray scale value and a difference value between the input gray scale value and an adjacent input gray scale value, output gray scale values between output gray scale values can be obtained by linear interpolation.

In a preferred embodiment of the mode, the interpolation circuit can use a first output gray scale value output from the first lookup-table storage unit and a difference value output from the second lookup-table storage unit to interpolate gray scale correction characteristics data between the first output gray scale value and a second output gray scale value that is adjacent to the first output gray scale value.

According to another exemplary mode of the image processing circuit, the first lookup-table storage unit can store gray scale correction characteristics data associated with odd-numbered input gray scale values among the gray scale correction characteristics data for the m levels, and the second lookup-table storage unit stores gray scale correction characteristics data associated with even-numbered input gray scale values among the gray scale correction characteristics data for the m levels. Accordingly, it can be possible to obtain two mutually adjacent output gray scale values simultaneously from the respective lookup-table storage units and to obtain output gray scale values therebetween by linear interpolation. Furthermore, since mutually adjacent two input gray scale values are a pair of an odd-numbered input gray scale value and an even-numbered input gray scale value, by providing lookup-table storage units respectively for odd-numbered input gray scale values and even-numbered input gray scale values, the storage capacities of the respective lookup-table storage units can be reduced to one half.

In a preferred embodiment of the mode, the interpolation circuit can include a device for determining, based on the image data, magnitude relationship of a first output gray scale value output from the first lookup-table storage unit and a second output gray scale value output from the second lookup-table storage unit; and a device for interpolating gray scale correction characteristics data between the first output gray scale value and the second output gray scale value based on the magnitude relationship. Since the magnitude relationship of two output gray scale values is determined based on whether an input gray scale value is an even number or an odd number, linear interpolation can be readily performed.

According to another mode of the image processing circuit, when an input gray scale value associated with a larger one of the first and second output gray scale values is 0, the interpolation circuit carries out interpolation while setting a smaller one of the first and second output gray scale values to 0. According to another mode of the image processing circuit, when an input gray scale value associated with a smaller one of the first and second output gray scale value is a maximum gray scale value, the interpolation circuit carries out interpolation while setting a larger one of the first and second output gray scale values to a maximum gray scale value. In either mode, all the lacking output gray scale values can be provided by linear interpolation.

According to another exemplary mode of the image processing circuit, a color reduction processing circuit can be further provided, which performs dither processing on the image data obtained by the gray scale correction to reduce colors, outputting image data represented in the m gray scale levels. Accordingly, the amount of image data can be reduced without causing degradation in picture quality, in accordance with the display capability of a display device used to display the image data.

It is possible to implement an image display apparatus including the image processing circuit described above and an image display unit for displaying the image data obtained by the gray scale correction. For example, an image display apparatus such as a portable phone, a PDA, or a digital camera can be implemented using an LCD as an image display unit.

According to another exemplary aspect of the invention, an image processing method can be carried out in an image processing circuit including first and second lookup-table storage units that store gray scale correction characteristics data for m gray scale levels in relation to input image data represented in n gray scale levels, m being less than n. The image processing method can include a step of receiving input of the input image data, a step of linearly interpolating the gray scale correction characteristics data using outputs from the first and second lookup-table storage units, the outputs being associated with mutually adjacent input gray scale values, and a step of correcting gray scales of the image data using the gray scale correction characteristics data obtained by the linear interpolation.

The image processing circuit according can be applied, for example, to color correction or gamma correction of color image data. Gray scale correction characteristics data for a number of gray scale levels that is than the number of gray scale levels of input image data is stored in first and second lookup table storing units. Considering a gray scale value of a pixel that is being considered for gray scale correction processing as an input gray scale value, the first and second lookup-table storing units are referred to, obtaining an output gray scale value corresponding to the input gray scale value and an output gray scale value corresponding to an adjacent input gray scale value. Then, output gray scale values between these two adjacent output gray scale values can be calculated by linear interpolation, obtaining output values for all input gray scale values. Then, gray scale correction is performed for each pixel of input image data, outputting corrected image data.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Now, preferred embodiments of the invention will be described with reference to the drawings.

Figure 1:
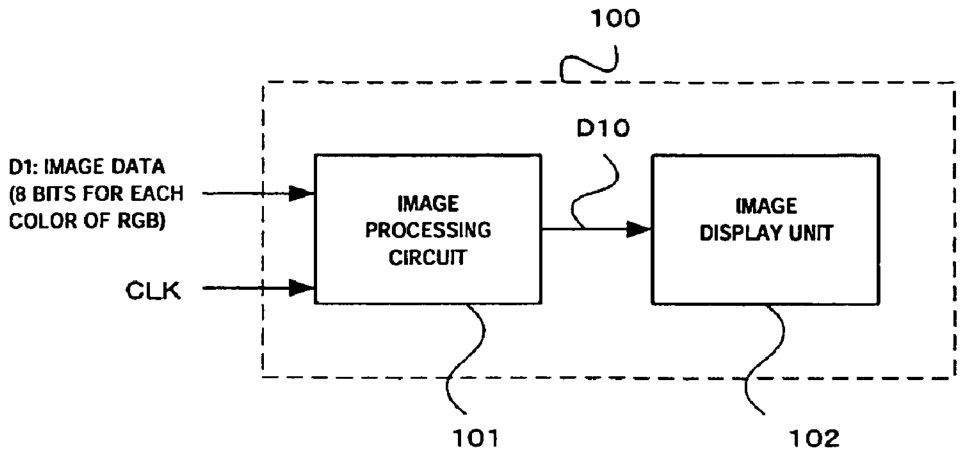
FIG. 1 is an exemplary block diagram of an image display apparatus including an image processing circuit according to the invention.

FIG. 1 is a schematic block diagram showing an exemplary construction of an image display apparatus including an image processing circuit according to the present invention.

As shown in FIG. 1, an image display apparatus 100 can include an image processing circuit 101 and an image display unit 102. The image display apparatus 100 is, for example, a cellular phone, a portable terminal, a PDA, or a digital camera.

The image processing circuit 101 performs processing for correcting gray scale characteristics, including color correction and gamma correction, on externally supplied image data D1, supplying corrected image data D10 to the image display unit 102. The image processing circuit 101 also receives input of a clock signal CLK that is synchronized with the image data D1. The image display unit 102 can include a display device, such as a CRT or an LCD (liquid crystal display), and it displays the corrected image data D10.

Figure 2:
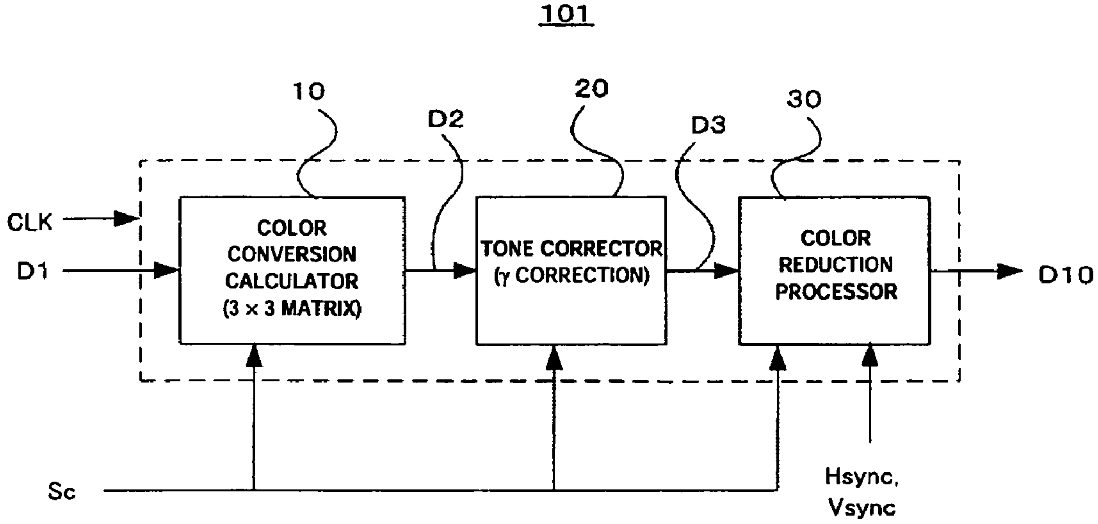
FIG. 2 is an exemplary block diagram showing the internal construction of an image processing circuit 101 shown in FIG. 1.

FIG. 2 is an exemplary block diagram showing the internal construction of the image processing circuit 101 shown in FIG. 1. As shown in FIG. 2, the image processing circuit 101 includes a color conversion calculator 10, a gray scale corrector 20, and a color reduction processor 30. The color conversion calculator 10 performs color conversion processing on the externally supplied image data D10 to achieve desired color characteristics, supplying image data D2 obtained by the color conversion to the gray scale corrector 20. The input image data D10 is digital data having eight bits for each color of RGB. The color conversion calculator 10 performs color conversion processing by a 3×3 matrix calculation. The image data D2 obtained by the color conversion also has eight bits for each color of RGB. The color conversion calculator 10 also receives input of a register control signal Sc in addition to the image data D1.

The gray scale corrector 20 is implemented using an image processing circuit according to the present invention. The gray scale corrector 20 performs gamma correction on the image data D2 obtained by the color conversion, correcting the gray scale characteristics of the image data D2, and supplies corrected image data D3 to the color reduction processor 30. The corrected image data D3 also has eight bits for each color of RGB. The gray scale corrector 20 receives input of the register control signal Sc.

The color reduction processor 30 performs color reduction processing on the image data D3 obtained by the gamma correction. As described above, the image data D3 obtained by the gamma correction has eight bits for each color of RGB. The color reduction processor 30 bit-slices, for example, the high-order six bits of the image data D3 to obtain data having six bits for each color of RGB, and performs dither processing based on the low-order two bits, supplying image data D10 having six bits for each color of RGB (equivalent to eight bits for each color due to the dither processing) to the image display unit 102.

Depending on the display capability of the image display unit 102, the color reduction processor 30 may supply image data having eight bits for each color to the image display unit 102 without performing color reduction processing. For example, when the image display unit 102 is capable of displaying an image at a resolution of eight bits for each color, the color reduction processor 30 supplies the image data D10 having eight bits for each color to the image display unit 102 without performing color reduction processing. On the other hand, when the image display unit 102 is capable of displaying an image only at a resolution of six bits for each color, the color reduction processor 30 performs color reduction processing to create image data having six bits for each color, and supplies the image data to the image display unit 102. The color reduction processor 30 receives input of the register control signal Sc, and a horizontal synchronization signal Hsync and a vertical synchronization signal Vsync that are synchronized with the image data D1, in addition to the image data D3 obtained by the gamma correction.

Figure 3:
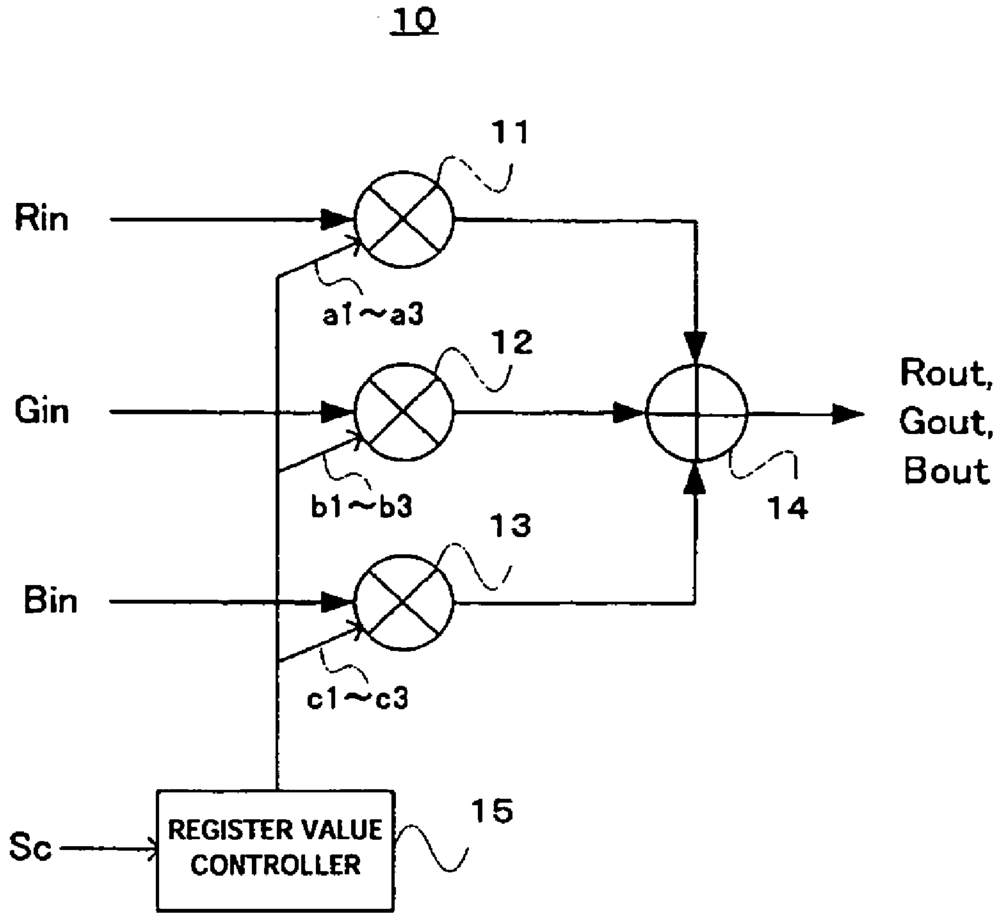
FIG. 3 is an exemplary block diagram showing the construction of a color conversion calculator.

Next, the color conversion calculator 10 will be described in detail. FIG. 3(*a*) shows an exemplary construction of the color conversion calculator 10. The color conversion calculator 10 can include three multipliers 11 to 13, an adder 14, and a register value controller 15, and it executes a 3×3 matrix calculation shown in FIG. 3(*b*). The multipliers 11 to 13 use multiplication coefficients a1 to a3, b1 to b3, and c1 to c3, respectively, determined by the register value controller 15 based on the register control signal Sc and set to the respective multipliers 11 to 13.

More specifically, the multiplier 11 multiplies R (red) data Rin of the image data D1 with the coefficients a1 to a3, outputting the results to the adder 14. The multiplier 12 multiplies G (green) data Gin of the image data D1 with the coefficients b1 to b3, outputting the results to the adder 14. The multiplier 13 multiplies B (blue) data Bin of the image data D1 with the coefficients c1 to c3, outputting the results to the adder 14. The adder 14 adds together the outputs of the multipliers 11 to 13 to generate Rout, Gout, and Bout, outputting these components as image data D2.

The color characteristics of the output image data D2 (i.e., Rout, Gout, and Bout) vary depending on the coefficients a1 to a3, b1 to b3, and c1 to c3 set by the register value controller 15. When the coefficients a1, b2, and c3 are set to "1" and the other coefficients are set to "0", the input image data D1 and the output image data D2 have the same color characteristics. For example, when color characteristics with some emphasis on red are desired for the output image data D2, the coefficients a1 to a3 for multiplying Rin therewith should be chosen to be somewhat larger.

First Exemplary Embodiment of Gray Scale Corrector

Figure 4:
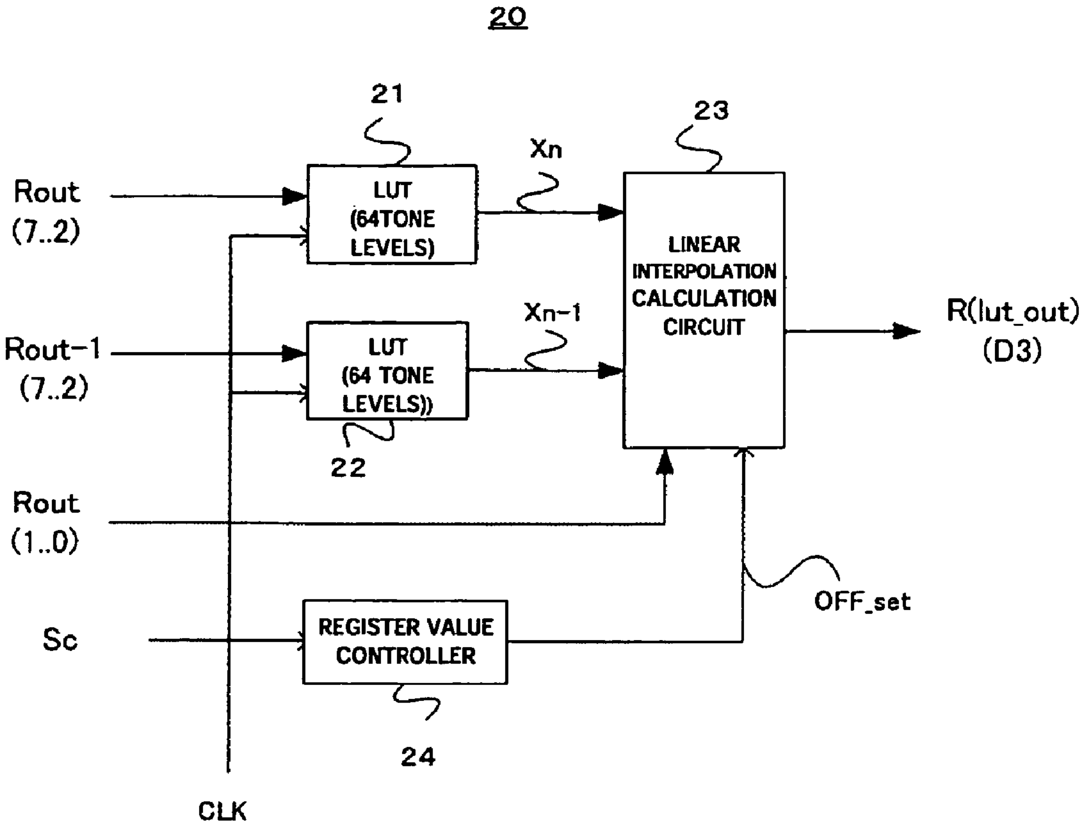
FIG. 4 is an exemplary block diagram of a gray scale corrector according to a first exemplary embodiment.
Figure 4:
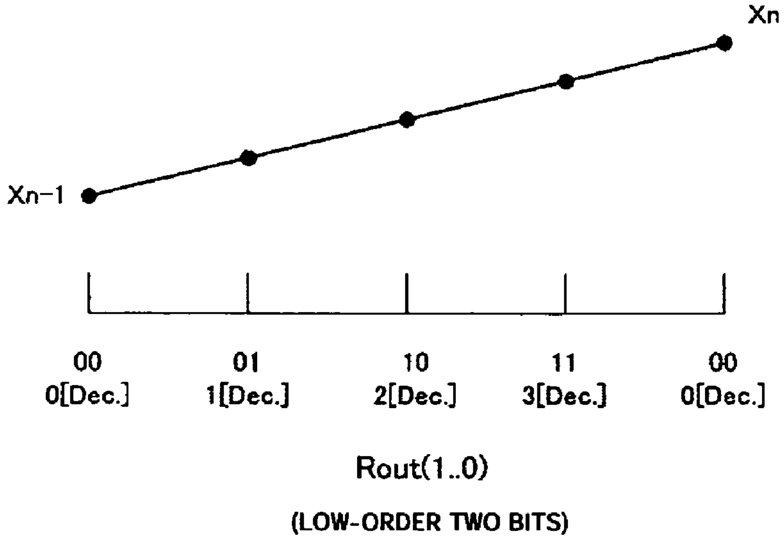

Next, a first exemplary embodiment of gray scale corrector will be described. FIG. 4 schematically shows the construction of a gray scale corrector 20 according to the first embodiment. As shown in FIG. 4(*a*), the gray scale corrector 20 includes LUTs 21 and 22, a linear interpolation calculation circuit 23, and a register value controller 24. Each of the LUTs 21 and 22 stores gamma characteristics for 64 gray scale levels (corresponding to six bits) of input gray scale values and 256 gray scale levels of output gray scale values. Since the image data D2 output from the color conversion calculator 10 has eight bits (equivalent to 256 gray scale levels) for each color of RGB, the gray scale correction characteristics data stored in the LUTs 21 and 22 have a smaller number of gray scale levels when compared with input image data. Thus, the capacity of RAMs or the like for implementing the LUTs 21 and 22 may be smaller. Although FIG. 4(*a*) shows only parts associated with R data among data of the three colors of RGB, similar arrangements are provided for G data and B data.

Figure 5:
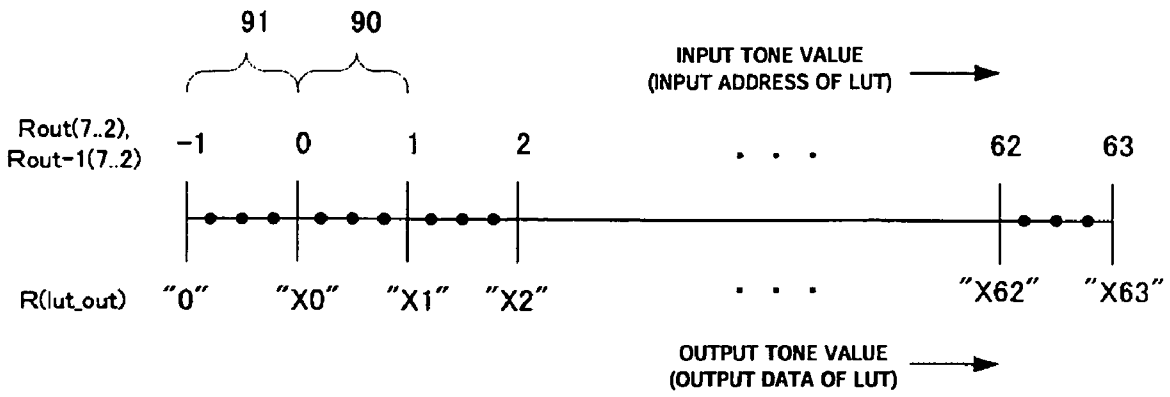
FIG. 5 is an exemplary diagram for explaining a method of linear interpolation calculation.
Figure 5:
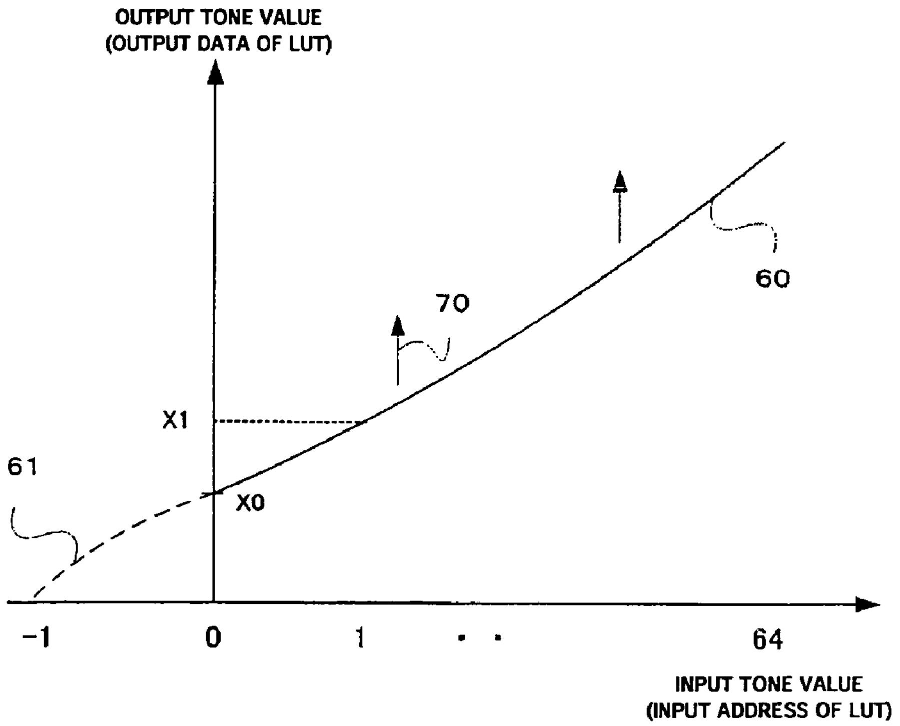

FIG. 5(*b*) shows an example of gray scale correction characteristics data (gamma characteristics data) stored in the LUTs 21 and 22. Gray scale correction characteristics 60 can be represented by a graph showing relationship between input gray scale values and output gray scale values. Each of the LUTs stores addresses data corresponding to output gray scale values at addresses corresponding to input gray scale values. Thus, considering a gray scale value of a pixel of input image data as an input gray scale value, data stored at an address of the LUT corresponding to the input gray scale value is output as an output gray scale value. In this embodiment, the input gray scale values are represented in 64 gray scale levels, and the output gray scale values are represented in 256 gray scale levels.

The LUTs 21 and 22 shown in FIG. 4(*a*) store the same gray scale correction characteristics data. The reason why two LUTs are provided is that output gray scale values of two endpoints of characteristics to be interpolated are needed in a linear interpolation calculation by the linear interpolation calculation circuit 23.

Referring to FIG. 4(*a*), the LUT 21 receives input of the high-order six bits Rout(7 . . . 2) of R data of a pixel in the image data D2. In the following description, inside the parentheses of a notation Rout( ) are subject bits. For example, a notation Rout(7 . . . 0) is used in the case of all the eight bits, and a notation Rout(1 . . . 0) is used in the case of low-order two bits. The LUT 21, considering the R data as an input gray scale value, outputs a corresponding output gray scale value Xn to the linear interpolation calculation circuit 23.

The LUT 22 receives input of a gray scale value Rout−1(7 . . . 0) that is lower by one than Rout(7 . . . 0) input to the LUT 21 as an input gray scale value, and outputs a corresponding output gray scale value Xn−1 to the linear interpolation calculation circuit 23. Furthermore, the value of the low-order two bits Rout(1 . . . 0) of the same pixel is supplied to the linear interpolation calculation circuit 23.

FIG. 4(*b*) schematically shows a linear interpolation calculation by the linear interpolation calculation circuit 23. As described above, while input image data has eight bits for each color of RGB, the input gray scale values of gray scale correction characteristics data stored in the LUTs 21 and 22 have only six bits (equivalent to 64 gray scale levels). Thus, output gray scale values corresponding to input gray scale values associated with the lacking two bits must be interpolated by the linear interpolation calculation circuit 23. As shown in FIG. 4(*b*), the linear interpolation calculation circuit 23 performs a calculation for linearly interpolating three output gray scale values between an output gray scale value Xn corresponding to an input gray scale value Rout(7 . . . 2) of a pixel and an output gray scale value Xn−1 corresponding to an input gray scale value Rout−1(7 . . . 0) lower by one than the input gray scale value Rout(7 . . . 2), based on the value of the low-order two bits Rout(1 . . . 0) of the pixel. Thus, the linear interpolation calculation circuit 23 is allowed to create gray scale correction characteristics data for 256 gray scale levels (equivalent to eight bits) using the. LUTs 21 and 22 for 64 gray scale levels (equivalent to six bits).

More specifically, the calculation by the linear interpolation calculation circuit 23 can be expressed by the following equation.

$$R(\text{lut\_out})=Xn-1+(Xn-Xn-1)\times(R\text{out}(1\ldots0)[\text{Dec}]/4)+\text{OFF\_set} \quad \text{(equation 1)}$$

where Xn−1=0 when Rout−1(7 . . . 2)=−1. ([Dec] indicates decimal notation.)

Now, the where clause for equation 1 will be described. When gray scale correction characteristics data for input gray scale values of 64 gray scale levels are linearly interpolated to create gray scale correction characteristics data for input gray scale values of 256 gray scale levels, if three gray scale values are interpolated in each interval of adjacent two gray scale values among the gray scale values 0 to 63, as shown in FIG. 4(*b*), the overall number of gray scale levels can be calculated as follows:

64 (number of gray scale levels in LUTs)+63 (number of intervals between 0 to 63)×3 (gray scale values)=253. Thus, an insufficiency of three gray scale levels arises relative to 256 gray scale levels. Thus, three gray scale levels are provided below an input gray scale value (an address input to LUTs) of 0 to achieve 256 gray scale levels as a whole.

Referring to FIG. 5(*a*), for example, when gray scale values output from the LUTs 21 and 22 are Xn=X1 and Xn−1=X0, three output gray scale values designated by a reference numeral 90 are interpolated between the output gray scale values X0 and X1. When the output value Xn=X0, instead of simply considering the output gray scale value Xn−1 to be absent, the output gray scale value Xn−1 is always set to 0 when an input gray scale value Rout−1(7 . . . 2) is −1, thereby interpolating three gray scale values as indicated by a reference numeral 91 in FIG. 5(*a*). This corresponds to interpolating a portion 61 denoted by a broken line in FIG. 5(*b*). Thus, gray scale correction characteristics data for input gray scale values of all the 256 gray scale levels can be created.

In the construction shown in FIG. 4(*a*), the register value controller 24 supplies an offset OFF_set to the linear interpolation calculation circuit 23 based on the register control signal Sc, so that the example gray scale correction characteristics 60 shown in FIG. 5(*b*) are shifted as a whole in a direction of increase in gray scale value as indicated by an arrow 70.

As described above, the gray scale corrector 20 stores in LUTs gray scale correction characteristics data for input gray scale values having six bits (equivalent to 64 gray scale levels) for each color with regard to input image data having eight bits for each color of RGB (equivalent to 256 gray scale levels). With regard to the insufficiency, the gray scale corrector 20 generates output gray scale values by linear interpolation based on the low-order two bits of input gray scale values to perform correction of gray scale characteristics (gamma correction). Thus, it is not required to store gray scale correction characteristics data for input gray scale values of 256 gray scale levels corresponding to all the gray scale levels of input image data. This serves to reduce the needed capacity of storage devices for implementing LUTs, such as RAMs. In this embodiment, as compared with a case where gray scale correction characteristics data for input gray scale values of 256 gray scale levels is stored in a RAM, since it suffices to provide two LUTs that store gray scale correction characteristics data for input gray scale values of 64 gray scale levels, the total RAM capacity can be reduced to one half.

In this embodiment, two LUTs are provided, and output gray scale values Xn and Xn−1 of two endpoints used for linear interpolation are read from the respective LUTs. As described above, a read clock rate must be increased when output gray scale values of two endpoints are read from a single LUT. However, that is not needed in this exemplary embodiment, so that increase in power consumption is avoided.

Color Reduction Circuit

Figure 7:
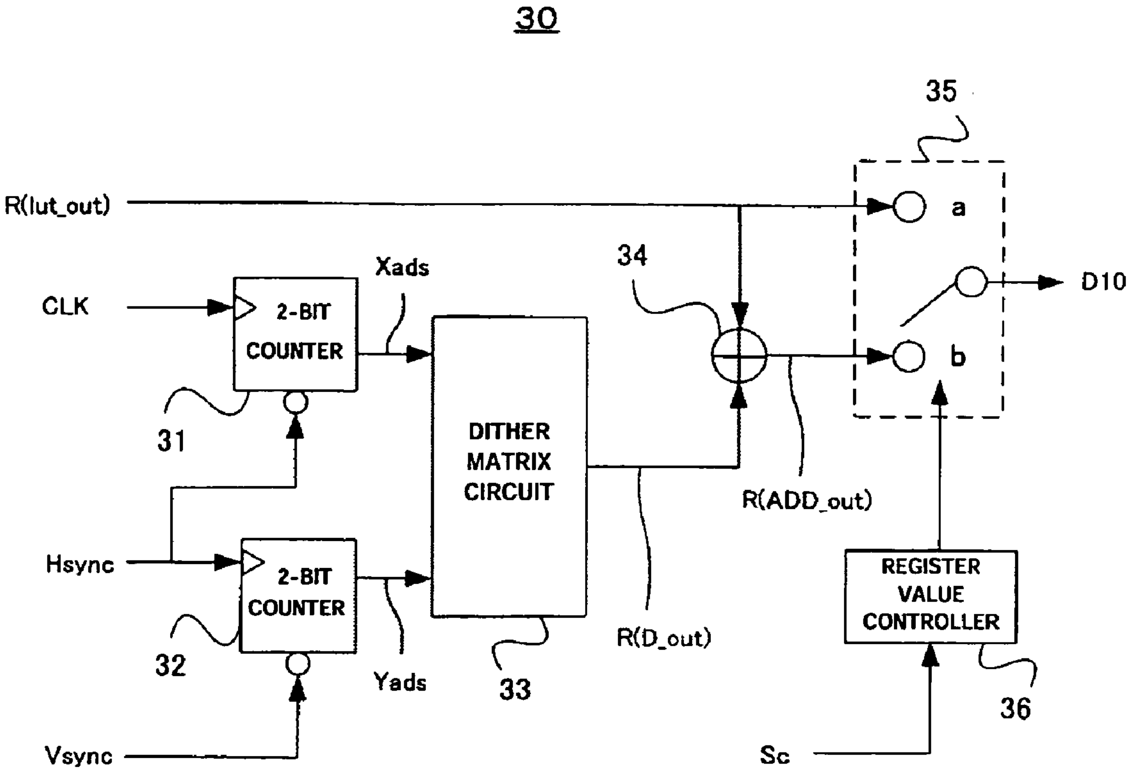
FIG. 7 is an exemplary block diagram showing the construction of the color reduction processor.

Now, the color reduction processor will be described. As shown in FIG. 2, the color reduction processor 30 performs bit slicing and dithering on the image data D3 output from the gray scale corrector 20, having eight bits for each color of RGB, i.e., R(lut_out), G(lut_out), and B(lut_out), to output image data D10 having six bits for each color of RGB. FIG. 7 shows an example construction of the color reduction processor 30. Although FIG. 7 shows only parts associated with R data, similar arrangements are provided for G-data and B data.

Figure 6:
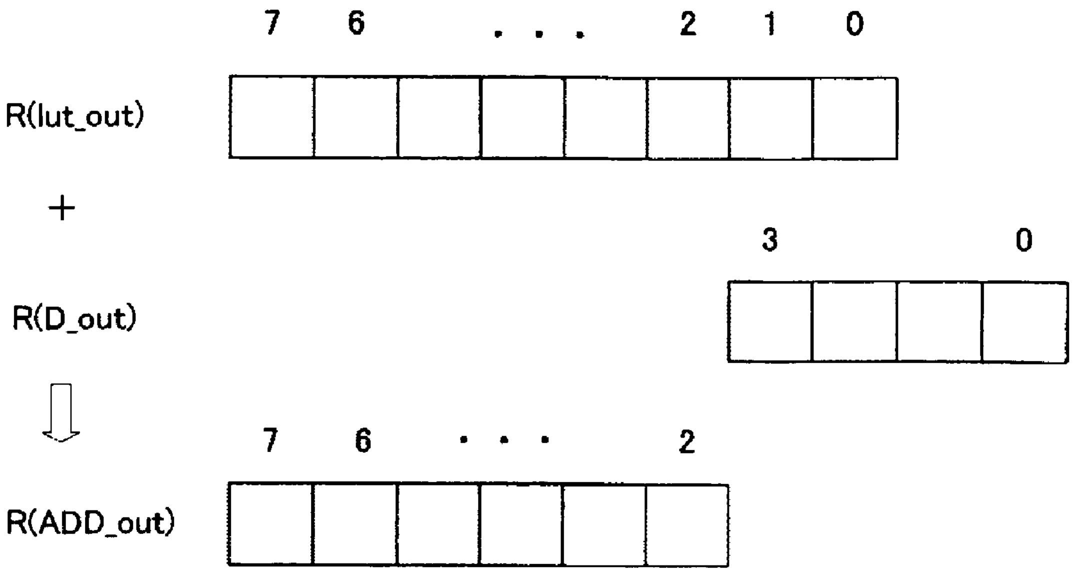
FIG. 6 is an exemplary diagram showing an example of dither matrix and an example of processing in a color reduction processor.

Referring to FIG. 7, the color reduction processor 30 can include 2-bit counters 31 and 32, a dither matrix circuit 33, an adder 34, a switcher 35, and a register value controller 36. FIG. 6(*a*) shows an example of 4×4 dither matrix used in the dither matrix circuit 33.

The counter 31 counts the clock signal CLK synchronized with the image data D3 to output a 2-bit X address Xad to the dither matrix circuit 33. The counter 31 is reset by the horizontal synchronization signal Hsync. The counter 32 counts the horizontal synchronization signal Hsync to output a 2-bit Y address Yad to the dither matrix circuit 33. The counter 32 is reset by the vertical synchronization signal Vsync.

The dither matrix circuit 33, based on the input X address Xads and Y address Yads, supplies a value defined in the dither matrix to the adder 34 as R(D_out). As shown in FIG. 6(*b*), the adder 34 adds together the R data R(lut_out) output from the gray scale corrector 20 and the high-order two bits of the value R(D_out) output from the dither matrix circuit 33, outputting the high-order six bits of the result to an input terminal b of the switcher 35 as R(ADD_out). Thus, the image data D3 having eight bits for each color of RGB, supplied from the gray scale corrector 20, is reduced to image data having six bits for each color. Since dither processing is performed, the image data having six bits for each color has color characteristics equivalent to eight bits for each color.

The output of the switcher 35 is switched according to a register value output from the register value controller 36 based on the register control signal Sc. When an input terminal a of the switcher 35 is selected, image data having eight bits for each color of RGB, not having undergone color reduction processing, is output as image data D10. On the other hand, when the input terminal b of the switcher 35 is selected, image data having six bits for each color of RGB, obtained by color reduction processing, is output as image data D10.

Second Exemplary Embodiment of Gray Scale Corrector

Figure 8:
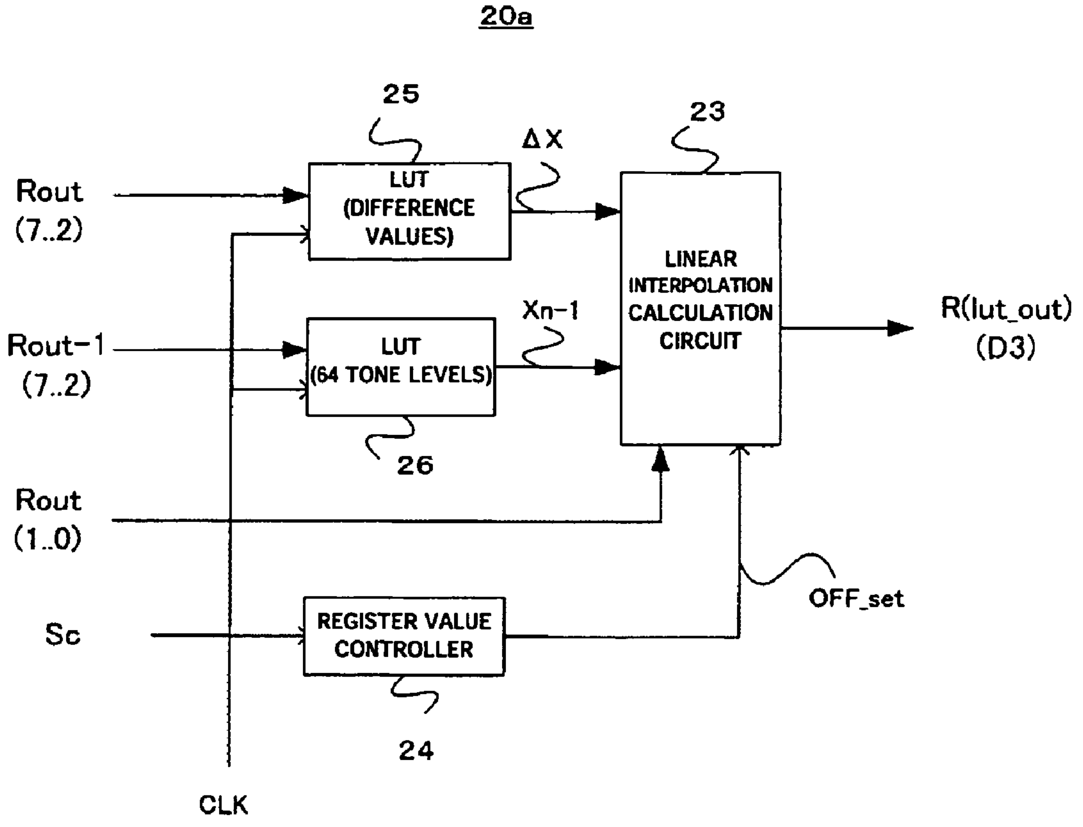
FIG. 8 is an exemplary block diagram showing a gray scale corrector according to a second exemplary embodiment.
Figure 8:
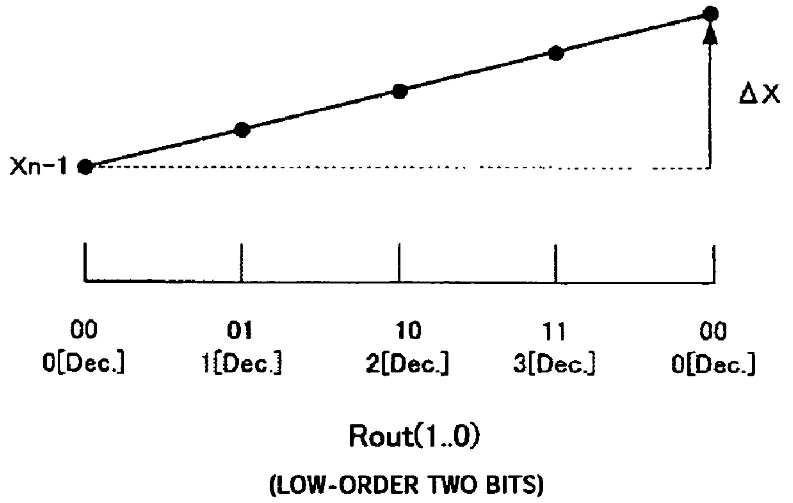

Next, a second embodiment of gray scale corrector will be described. FIG. 8(*a*) shows the construction of a gray scale corrector 20*a* according to the second exemplary embodiment. In the second embodiment, the contents of gray scale correction characteristics data stored in two LUTs differ from each other. In the gray scale corrector 20 according to the first embodiment, the same gray scale correction characteristics data are stored in the two LUTs 21 and 22. In contrast, in the second embodiment, one LUT 26 stores gray scale correction characteristics data for input gray scale values of 64 gray scale levels, and another LUT 25 stores values of differences between adjacent gray scale values among the gray scale correction characteristics data stored in the LUT 26. Otherwise, the second embodiment is substantially the same as the first embodiment.

An input gray scale value Rout(7 . . . 2) of a pixel in input image data is input to the LUT 25, and a difference value ΔX associated therewith is supplied to the linear interpolation calculation circuit 23. Furthermore, an input gray scale value Rout−1(7 . . . 2) of the same pixel, lower by one than the input gray scale value Rout(7 . . . 2), is input to the LUT 26, and a corresponding output gray scale value Xn−1 is supplied to the linear interpolation calculation circuit 23.

FIG. 8(*b*) schematically shows a linear interpolation calculation by the linear interpolation calculation circuit 23. As shown in FIG. 8(*b*), the difference value ΔX output from the LUT 25 represents a difference between an output gray scale value corresponding to an input gray scale value of the pixel and an output gray scale value corresponding to an input gray scale value that is lower by one. Thus, the linear interpolation calculation circuit 23 uses the output gray scale value Xn−1 and the difference value ΔX to interpolate between these adjacent output gray scale values. More specifically, the linear interpolation calculation circuit 23 performs the calculation expressed by the following equation.

$$R(\text{lut\_out}) = Xn-1+\Delta X\times(Rout(1\ldots0)[\text{Dec}]/4)+\text{OFF\_set} \quad \text{(equation 2)}$$

where Xn−1=0 when Rout−1(7 . . . 2)=−1. ([Dec] indicates decimal notation.) The meaning of the where clause for equation 2 is the same as that for equation 1.

It suffices for the LUT 25 to store difference values ΔX between adjacent output gray scale values. As will be understood from FIG. 8(*b*), the difference values ΔX can be represented by a smaller number of gray scale levels compared with the original gray scale correction data, so that it suffices for the LUT 25 to store a smaller number of gray scale values (i.e., a smaller number of bits) than the LUT 26. For example, when the LUT 25 for storing difference values is implemented by an LUT having an output of 16 gray scale levels (i.e., four bits), the capacity of a RAM for implementing the LUT 25 may be one half of the capacity of a RAM for implementing the LUT 26. In that case, compared with the case where a single LUT having output gray scale values of eight bits (equivalent to 256 gray scale levels) is used, the total RAM capacity needed for LUTs is reduced to ⅜.

In the case of the first exemplary embodiment, when gray scale correction characteristics data is stored in the LUTs 21 and 22, gray scale correction characteristics data prepared in advance is simply stored in the LUTs. On the other hand, in the case of the second exemplary embodiment, in addition to storing gray scale correction characteristics data prepared in advance in the LUT 26, difference values must be calculated based on the gray scale correction characteristics data and stored in the LUT 25.

Third Exemplary Embodiment of Gray Scale Corrector

Next, a third exemplary embodiment of gray scale corrector will be described. In the first exemplary embodiment, the same gray scale correction characteristics data for input gray scale values of 64 gray scale levels is stored in the two LUTs 21 and 22. Two output gray scale values used in a linear interpolation calculation are an input gray scale value of a pixel of image data and an input gray scale value that is adjacent thereto (i.e., upper or lower by one). Thus, when one of these two adjacent input gray scale values is an odd number, the other is an even number. Conversely, when one of these two adjacent input gray scale values is an even number, the other is an odd number. In other words, it is impossible that two adjacent input gray scale values are simultaneously even numbers or simultaneously odd numbers. Accordingly, in the third embodiment, gray scale correction characteristics data for 64 gray scale levels are divided into gray scale correction characteristics data associated with odd-numbered input gray scale values and gray scale correction characteristics data associated with even-numbered input gray scale values, storing the respective gray scale correction characteristics data separately in two LUTs. Thus, the capacity of RAMs for implementing LUTs can be further reduced.

Figure 9:
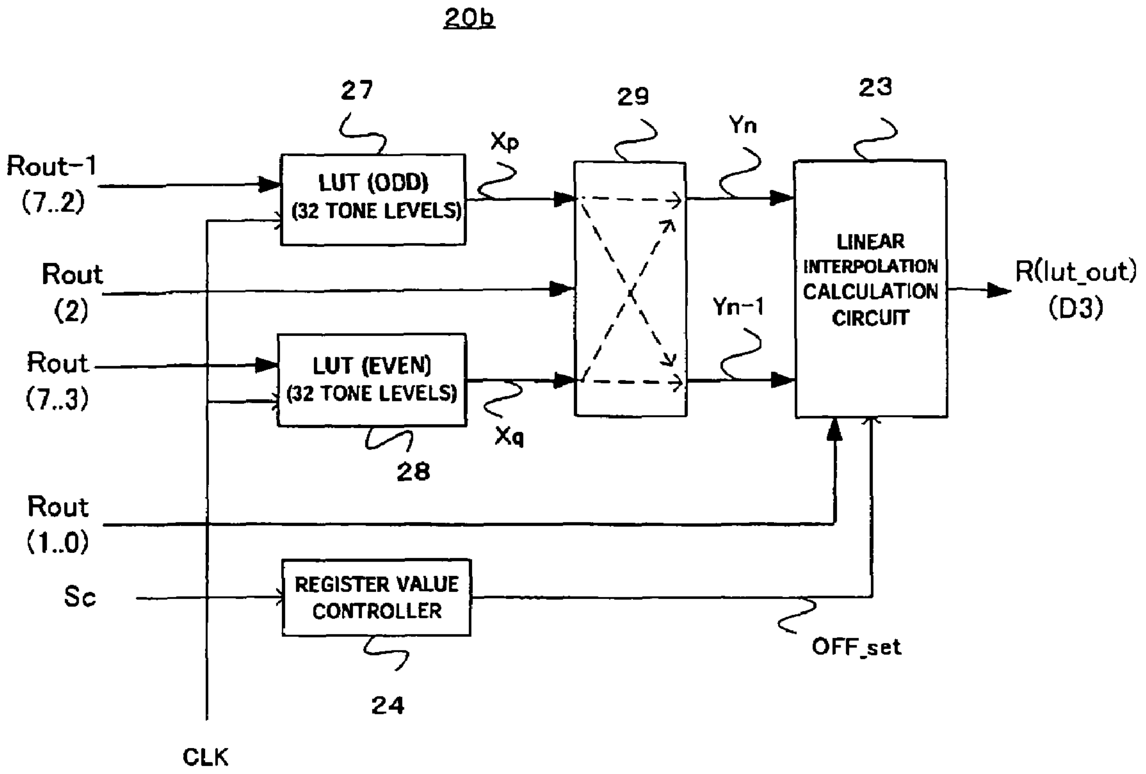
FIG. 9 is an exemplary block diagram showing a gray scale corrector according to a third exemplary embodiment.
Figure 9:
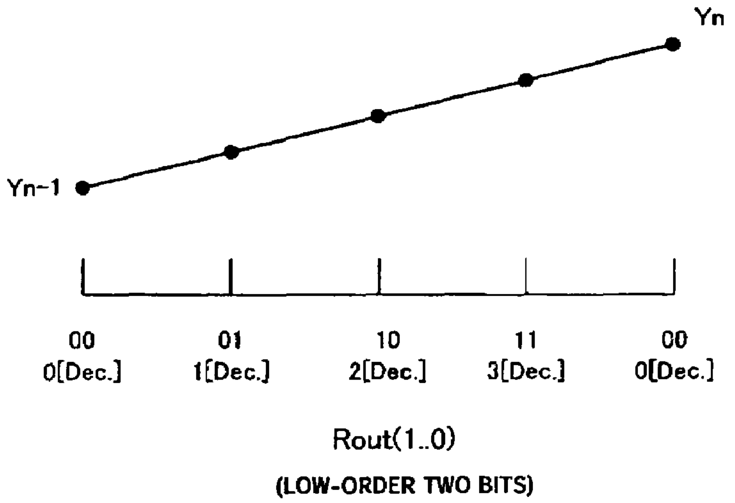

FIG. 9 shows the construction of the gray scale corrector according to the third exemplary embodiment. The LUT 27 stores gray scale correction characteristics data for 32 gray scale levels associated with odd-numbered input gray scale values, and the LUT 28 stores gray scale correction characteristics data for 32 gray scale levels associated with even-numbered gray scale values. Furthermore, a data switcher 29 is provided at a subsequent stage of the LUTs 27 and 28.

Of the input image data, Rout(7 . . . 3) corresponding to an even-numbered input gray scale value is input to the LUT 28, and a corresponding output gray scale value Xq is output to the data switcher 29. Also, Rout(7 . . . 2) corresponding to an odd-numbered input gray scale value is input to the LUT 27, and a corresponding output gray scale value Xp is output to the data switcher 29. Furthermore, Rout(2) representing the third lowest bit of the input image data is input to the data switcher 29. Rout(2) indicates whether the high-order six bits of the pixel being considered for correction of gray scale characteristics is an even number or an odd number, and it is used as a control signal for switching by the data switcher 29. The data switcher 29 switches relationship of input/output based on Rout(2), supplying the larger one of Xp and Xq as an output gray scale value Yn and the smaller one of Xp and Xq as an output gray scale value Yn−1 to the linear interpolation calculation circuit 23.

FIG. 9(*b*) schematically shows a linear interpolation calculation by the linear interpolation calculation circuit 23. The linear interpolation calculation circuit 23 interpolates between the output gray scale values Yn and Yn−1 supplied from the data switcher 29 based on the output gray scale values Yn and Yn−1 and Rout(1 . . . 0) representing the low-order two bits of the input gray scale value. More specifically, the linear interpolation calculation can be expressed by the following equation.

$$R(\text{lut\_out})=Yn-1+(Yn-Yn-1)\times(R\text{out}(1\ldots0)[\text{Dec}]/4)+\text{OFF\_set} \quad \text{(equation 3)}$$

where Yn−1=0 when Rout−1(7 . . . 2)=−1. ([Dec] indicates decimal notation.). The meaning of the where clause for equation 3 is the same as that in the first and second embodiments.

As described above, in the third exemplary embodiment, gray scale correction characteristics data for 64 gray scale levels are stored separately in the LUT 27 associated with odd-numbered input gray scale values and the LUT 28 associated with even-numbered input gray scale values. Thus, the capacity of RAMs needed to implement LUTs can be further reduced. Actually, the total RAM capacity is reduced to ¼ compared with the case where a single LUT having input gray scale values for 256 gray scale levels is used, and the total RAM capacity is reduced to one half when compared with the first embodiment.

Modifications.

Figure 10:
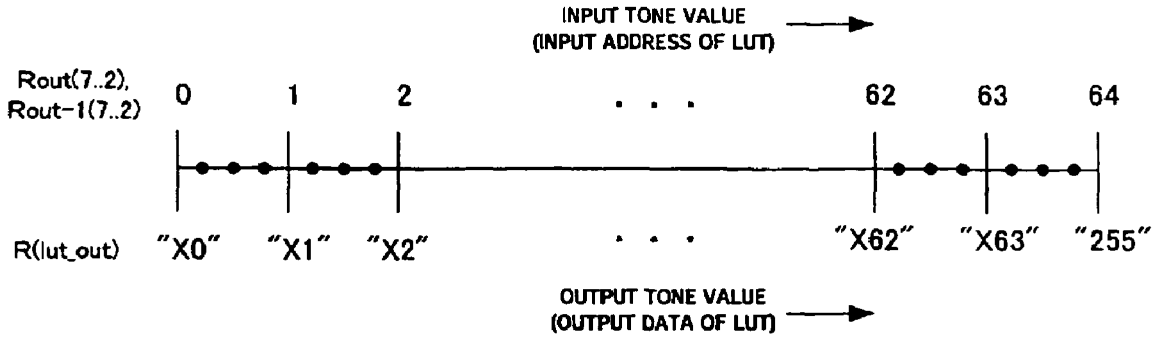
FIG. 10 is an exemplary diagram for explaining a method of linear interpolation calculation according to a modification.
Figure 10:
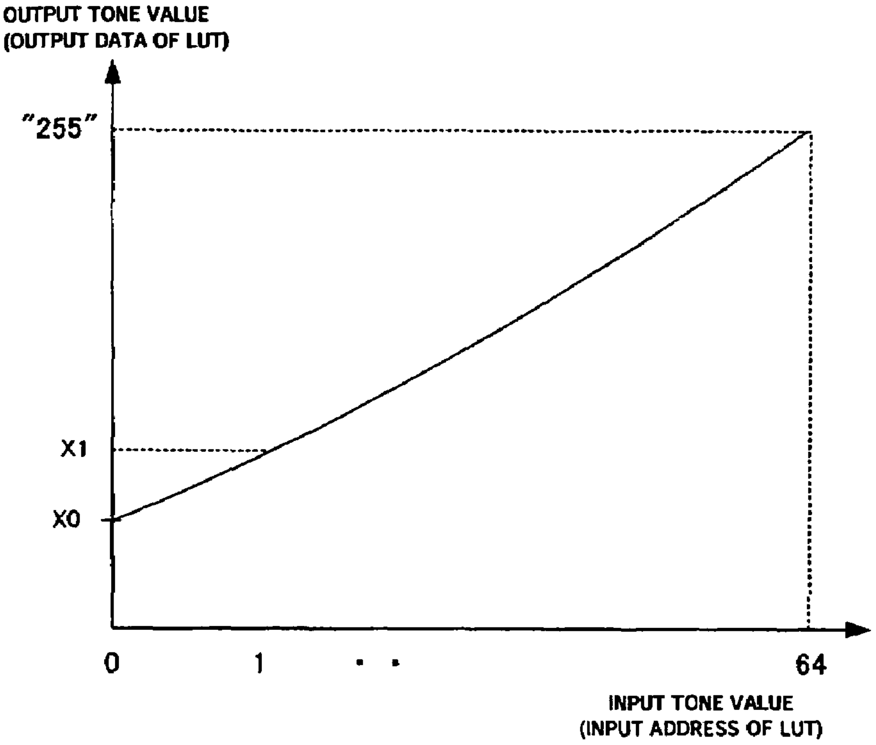

In the first to third exemplary embodiments of the gray scale corrector, as described with reference to FIG. 5, in the linear interpolation processing, three gray scale values are added below an input gray scale value of zero to provide 256 gray scale levels as a whole. Alternatively, as shown in FIG. 10, three gray scale values may be added above an input gray scale value of 63 to provide 256 gray scale levels as a whole. In that case, when the smaller one of two input gray scale values in the first embodiment is 63, i.e., when Xn−1=63, the output gray scale value corresponding to the input gray scale value Xn is set to "255". This is also true in the second and third exemplary embodiments.

It is to be noted, however, that "0" must be stored in a register or the like when three gray scale values are added to the smaller side of gray scale values, while "255" must be stored when three gray scale values are added to the larger side of gray scale values. Thus, a smaller area of the register is occupied when three gray scale values are added to the smaller side of gray scale values. Furthermore, of the smaller and larger sides of gray scale values, when gray scale values are added to the side corresponding to black color of a displayed image, the displayed image is less affected.

In the first exemplary embodiment described above, two input gray scale values used in linear interpolation processing are a gray scale value Rout(7 . . . 2) of a pixel and a gray scale value Rout−1(7 . . . 2) that is lower by one. Alternatively, linear interpolation may be carried out using a gray scale value Rout(7 . . . 2) of a pixel and a gray scale value Rout+1(7 . . . 2) that is higher by one.

In the second exemplary embodiment, a difference value between a gray scale value Rout(7 . . . 2) of a pixel and a gray scale value Rout−1(7 . . . 2) that is lower by one is stored in an LUT. Alternatively, a difference value between a gray scale value Rout(7 . . . 2) of a pixel and a gray scale value Rout+1(7 . . . 2) that is higher by one may be stored in an LUT.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An image processing circuit, comprising:

an input unit that receives input of image data represented in n gray scale levels;

first and second lookup-table storage units that store gray scale correction characteristics data for m gray scale levels, where m is less than n;

an interpolation circuit that linearly interpolates the gray scale correction characteristics data using outputs from the first and second lookup-table storage units, the outputs being associated with mutually adjacent input gray scale values; and a gray scale correcting circuit that corrects gray scales of the image data using gray scale correction characteristics data obtained by the linear interpolation;

the interpolation circuit using a first output gray scale value output from the first lookup-table storage unit and a second output gray scale value output from the second lookup-table storage unit, the second output gray scale value being less than the first output gray scale value, to interpolate gray scale correction characteristics data between the first output gray scale value and the second output gray scale value.

2. The image processing circuit according to claim 1, the first and second lookup-table storage units storing same gray scale correction characteristics data.

3. The image processing circuit according to claim 1, the first lookup-table storage unit storing gray scale correction characteristics data associated with odd-numbered input gray scale values among the gray scale correction characteristics data for the m levels, and the second lookup-table storage unit storing gray scale correction characteristics data associated with even-numbered input gray scale values among the gray scale correction characteristics data for the m levels.

4. The image processing circuit according to claim 3, the interpolation circuit comprising: a device that determines, based on the image data, a magnitude relationship of a first output gray scale value output from the first lookup-table storage unit and a second output gray scale value output from the second lookup-table storage unit; and a device that interpolates gray scale correction characteristics data between the first output gray scale value and the second output gray scale value based on the magnitude relationship.

5. The image processing circuit according to claim 1, when an input gray scale value associated with a larger one of the first and second output gray scale values is 0, the interpolation circuit carrying out interpolation while setting a smaller one of the first and second output gray scale values to 0.

6. The image processing circuit according to claim 1, when an input gray scale value associated with a smaller one of the first and second output gray scale value is a maximum gray scale value, the interpolation circuit carrying out interpolation while setting a larger one of the first and second output gray scale values to a maximum gray scale value.

7. The image processing circuit according to claim 1, further comprising a color reduction processing circuit that performs dither processing on the image data obtained by the gray scale correction to reduce colors, outputting image data represented in the m gray scale levels.

8. An image display apparatus, comprising the image processing circuit according to claim 1, and an image display unit that displays the image data obtained by the gray scale correction.

9. An image processing circuit, comprising:

an input unit that receives input of image data represented in n gray scale levels;

first and second lookup-table storage units that store gray scale correction characteristics data for m gray scale levels, where m is less than n;

an interpolation circuit that linearly interpolates the gray scale correction characteristics data using outputs from the first and second lookup-table storage units, the outputs being associated with mutually adjacent input gray scale values; and a gray scale correcting circuit that corrects gray scales of the image data using gray scale correction characteristics data obtained by the linear interpolation;

the first lookup-table storage unit storing gray scale correction characteristics data for the m gray scale levels, and the second lookup-table storage unit storing difference values between adjacent gray scale values in the gray scale correction characteristics data for the m levels.

10. The image processing circuit according to claim 9, the interpolation circuit using a first output gray scale value output from the first lookup-table storage unit and a difference value output from the second lookup-table storage unit to interpolate gray scale correction characteristics data between the first output gray scale value and a second output gray scale value that is adjacent to the first output gray scale value.

11. An image processing method carried out in an image processing circuit including first and second lookup-table storage units that store gray scale correction characteristics data for m gray scale levels in relation to input image data represented in n gray scale levels, m being less than n, the image processing method comprising:

receiving input of the input image data;

linearly interpolating the gray scale correction characteristics data using a first output gray scale value output from the first lookup-table storage unit and a second output gray scale value output from the second lookup-table storage unit, the second output gray scale value being less than the first output gray scale value, to interpolate gray scale correction characteristics data between the first output gray scale value and the second output gray scale value the outputs being associated with mutually adjacent input gray scale values; and correcting gray scales of the input image data using the gray scale correction characteristics data obtained by the linear interpolation.

* * * * *